US008514701B2

(12) United States Patent
Kalla et al.

(10) Patent No.: US 8,514,701 B2
(45) Date of Patent: Aug. 20, 2013

(54) AGGREGATING MULTIPLE RADIO LINKS FROM MULTIPLE MODEMS IN A COMMUNICATION DEVICE

(75) Inventors: Naveen Kalla, San Diego, CA (US); John N. Joseph, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 276 days.

(21) Appl. No.: 13/085,236

(22) Filed: Apr. 12, 2011

(65) Prior Publication Data

US 2012/0263033 A1    Oct. 18, 2012

(51) Int. Cl.
*H04L 12/26* (2006.01)

(52) U.S. Cl.
USPC .......................................... 370/230; 370/221

(58) Field of Classification Search
USPC ................................................. 370/221, 230
See application file for complete search history.

(56) References Cited

U.S. PATENT DOCUMENTS

| 7,840,988 | B1* | 11/2010 | Zhou ............................. | 725/114 |
| 2006/0193295 | A1* | 8/2006 | White et al. .................... | 370/336 |
| 2008/0291260 | A1* | 11/2008 | Dignan et al. ............. | 348/14.02 |
| 2010/0128857 | A1* | 5/2010 | Logan ........................ | 379/88.22 |
| 2010/0272165 | A1* | 10/2010 | Wright et al. .................. | 375/222 |
| 2011/0040888 | A1* | 2/2011 | Krishnaswamy et al. .... | 709/231 |
| 2011/0182289 | A1* | 7/2011 | Raman .......................... | 370/356 |
| 2011/0268118 | A1* | 11/2011 | Schlansker et al. .......... | 370/392 |
| 2011/0280124 | A1* | 11/2011 | Unger et al. .................. | 370/230 |
| 2011/0296006 | A1* | 12/2011 | Krishnaswamy et al. .... | 709/224 |
| 2012/0033665 | A1* | 2/2012 | Jacob Da Silva et al. .... | 370/389 |
| 2012/0236859 | A1* | 9/2012 | Subramanian et al. ....... | 370/392 |

FOREIGN PATENT DOCUMENTS

WO    2005094487 A2    10/2005

OTHER PUBLICATIONS

Webopedia, "The 7 Layers of the OSI Model", Oct. 8, 2010, p. 2, Publisher: Webpage downloaded Jan. 20, 2011 from http://www.webopedia.com/quick_ref/OSI_Layers.asp, Published in: US.
Tyson, Jeff, "How OSI Works", p. 7 Publisher: Webpage downloaded Jan. 20, 2011 from http://computer.howstuffworks.com/osi.htm, Published in: US.
Holmes, Bruce A., "Link Aggregation on the Dell PowerEdge 1855 Server Ethernet Switch", p. 13 Publisher: Webpage downloaded Jan. 19, 2011 from http://support.dell.com/support/edocs/network/LAG1855/LAGConsiderationv0.5, Published in: US.
Wikipedia, "Link Aggregation", p. 8 Publisher: Webpage downloaded Jan. 19, 2011 from http://en.wikipedia.org/wiki/Link_aggregation, Published in: US.

* cited by examiner

*Primary Examiner* — Mark Rinehart
*Assistant Examiner* — Christopher R Crompton
(74) *Attorney, Agent, or Firm* — Neugeboren O'Dowd PC

(57) ABSTRACT

Aggregating multiple modems in a communication device into a radio-frequency-link aggregation group increases the limited data bandwidth of RF data transmission between a communication device and its operator network. An aggregation controller in the communication device monitors the availability of its modems and selects modems to be used in a radio-frequency-link aggregation group. The aggregation controller also selects an aggregation algorithm. A radio-frequency-link aggregation module in the communication device distributes data to modems in the radio-frequency-link aggregation group in accordance with the aggregation algorithm. A connectivity service in the communication device notifies the operator network of the modems in the radio-frequency-link aggregation group and acknowledges that the operator network agrees to handle transmission from the radio-frequency-link aggregation group.

17 Claims, 7 Drawing Sheets

AGGREGATING MULTIPLE RADIO LINKS FROM MULTIPLE MODEMS IN A COMMUNICATION DEVICE

FIELD OF THE INVENTION

This invention relates to communication devices. More particularly it relates to mobile wireless communication devices.

BACKGROUND OF THE INVENTION

Communication devices, particularly smartphones have application processors transmitting high volumes of data to Internet servers. One limitation on data processing performed between communication devices and Internet servers is the bandwidth available for data transmission over the radio frequency (RF) link between phone and cellular tower.

Not all modems support all radio technologies these days. Smartphones nowadays have multiple modems so they can select a modem that operates with the highest data transmission rate available where the phone is located. The smartphone can select which modem is used based on data transmission rate offered by an operator network and its cellular data tower. Currently, the highest data transmission rate is provided by 4G (fourth generation) networks. Many operator networks have a portion of the cellular towers operating as 4G towers and other towers operating as 3G towers, but they cannot remove the 3G towers because they will still need to serve the consumers who do not have 4G capable phones.

Link aggregation to increase data transmission rate in Ethernet links is well known and is designed in accordance with a Link Aggregation Control Protocol (LACP). These control protocols do not address problems associated with aggregating modems and their RF links into a group to increase the bandwidth for data communication between communication devices and operator networks. LACP protocol works well for peer-to-peer links such as Ethernet where the and the switch are connected using Ethernet links on both ends, but it currently cannot be used in mobile networks.

It is with respect to these considerations and others that the present invention has been made.

SUMMARY OF THE INVENTION

In accordance with several embodiments of the present invention, aggregating multiple modems at a communication device into a radio-frequency-link aggregation group solves the above and other problems related to increasing the limited data bandwidth of RF links between a communication device and its operator network. An aggregation controller in the communication device monitors the availability of modems and radio signal availability and selects modems to be used in a radio-frequency-link aggregation group. A radio-frequency-link aggregation module in the communication device distributes data to modems in the radio-frequency-link aggregation group in accordance with an aggregation algorithm. A connectivity service in the communication device notifies the operator network of the subscription information and modems in the radio-frequency-link aggregation group. The connectivity service also verifies that the operator network agrees to handle transmission from the radio-frequency-link aggregation group. In the event of an RF link failure during transmission, the failed modem notifies the connectivity service and aggregation controller. The aggregation controller resets the radio-frequency-link aggregation group to a new set of selected modems and resets the aggregation algorithm. The connectivity service notifies the operator network of the new radio-frequency-link aggregation group.

In accordance with other aspects, the present invention relates to communication device apparatus for aggregating multiple modems in a communication device into a radio-frequency-link aggregation group to increase the data bandwidth of the radio frequency transmission from the communication device. An aggregation controller selects an aggregation algorithm and the multiple modems for the radio-frequency-link aggregation group. A connectivity service module sends subscription information and modem identifiers for the modems in the radio-frequency-link aggregation group from the communication device. An aggregation module responsive to the aggregation controller distributes data received from an application program to modems selected by the aggregation controller for data transmission from the phone whereby the data transmission rate from the communication device is increased.

In accordance with still other aspects, the present invention relates to a method for aggregating multiple modems of a communication device into radio-frequency-link aggregation group to increase the bandwidth of the radio frequency data transmission from the communication device. The method begins by selecting an aggregation algorithm and a set of selected modems from the multiple modems to make up the radio-frequency-link aggregation group. An act of sending information sends subscription information, modem identifiers and radio-frequency-link information for the selected modems from the communication device. A distributing act distributes data received from an application program to the selected modems for data transmission from the communication device whereby the data transmission rate from the communication device is increased.

The invention may be implemented as a computer process, a computing system or as an article of manufacture such as a computer program product or computer readable media. The computer program product may be a computer storage media readable by a computer system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

Figure 1:
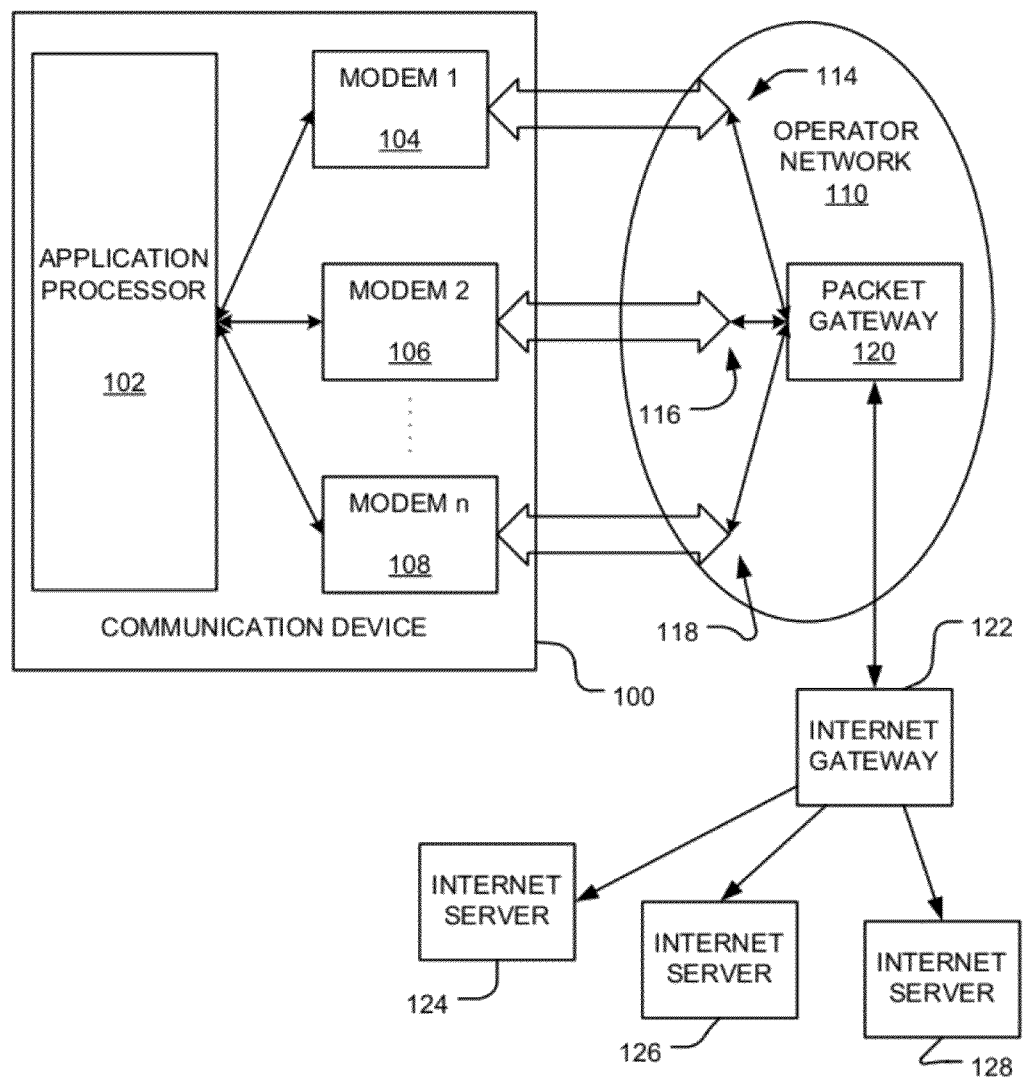
FIG. 1 shows a high-level system diagram of a communication device distributing data to multiple modems for RF (radio frequency) links to an operator network for communication to Internet servers.

FIG. 1 shows a high-level system diagram of a communication device 100 distributing data to multiple modems 104, 106, and 108 for RF (radio frequency) links to an operator network 110. Communication device 100 includes application processor 102 and multiple modems 104, 106, and 108. Although three modems are shown in FIG. 1, any number of modems might be placed in communication device 100 as represented by the variable "N" for the number of modem 108. The communication device 100 may be any one of a variety of devices that communicate wirelessly. For example, the communication device 100 may be realized as a smartphone, netbook, gaming device, PDA, tablet, or a laptop computer.

As shown, the application processor 102 distributes data packets from a single application to two or more of N modems including modems 104, 106, 108. As shown in FIG. 1 the data is distributed to modem 104, modem 106 and modem 108, and the distributed data is sent out by each modem 104, 106, 108 over a radio frequency (RF) link to a corresponding one of each of nodes 114, 116, 118 in an operator network 110. As depicted, modem 104 transmits its distributed data to node 114 in the operator network 110. Similarly, modems 106 and 108 transmit their distributed data to nodes 116 and 118, respectively, in the operator network 110. The distributed data is sent along N paths through the operator network 110 to the packet gateway 120. Packet gateway 120 combines the distributed data packet streams into a single aggregated data packet stream, and forwards the aggregated data to an Internet gateway 122. Internet gateway 122 passes the aggregated data to an Internet server 124, 126 or 128 called by the various applications in the communication device 100.

When any of the Internet servers 124, 126 and 128 reply to an application in the communication device 100, the responding server sends back data, via the Internet gateway 122, to the packet gateway 120, which is aware the communication device 100 is using the N modems 104, 106, 108 to distribute the data stream over N paths. As shown, packet gateway 120 distributes the data into N distributed data paths back to nodes 114, 116 and 118, and modems (not shown) at the nodes 114, 116, 118 transmit the N distributed data streams back to modems 104, 106 and 108, respectively. And application processor 102 combines the data streams received by the modems 104, 106, 108 into a single data stream and passes it to a TCP/IP stack (not shown), which then forwards the data to the application in the communication device 100 receiving the reply from one or more of the Internet servers 124, 126, 128.

Figure 2:
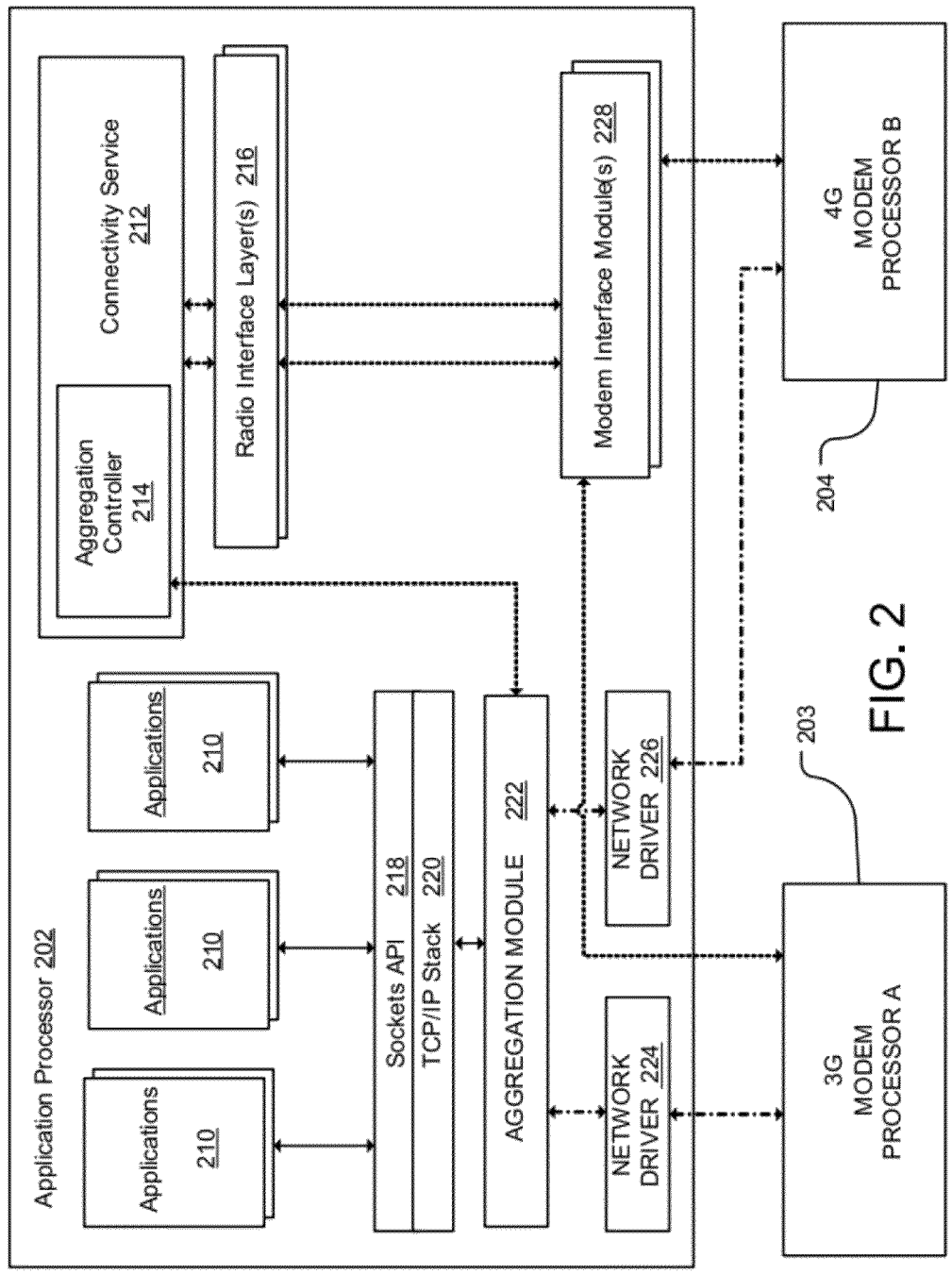
FIG. 2 shows an exemplary architecture for the communication device in FIG. 1.

FIG. 2 illustrates an exemplary architecture of the communication device 100 in FIG. 1. As depicted, application processor 202 is in communication with two modems 203 and 204. Modem 203 is a third generation (3G) modem processor for operating with 3G networks such as Universal Mobile Telecommunication System (UMTS) or Evolution-Data Optimized (EVDO). And modem 204 is a fourth generation (4G) modem processor designed for operating with 4G networks such as high-speed packet access plus (HSPA+) or Long Term Evolution (LTE). Both modems 203, 204 have their own processor and memory for processing packets to be transmitted and received through RF links between a communication device (e.g., communication device 100) and an operator network (e.g., operator network 110). Of course, other types modems might be used as further generations of cellular service become available. For compatibility with cellular services available, communication devices may have modems designed to work with each generation of cellular service. Alternatively multiple modems of the most advanced design might be used for the purpose of creating an aggregation group with the highest possible data transmission rate.

As shown, application processor 202 is running applications 210, and the application processor includes a connectivity service 212 (with its aggregation controller 214), radio interface layers 216, a sockets application program interface (API) 218, TCP/IP stack 220, aggregation module 222, network drivers 224 and 226, and modem interface modules 228. Radio interface layers 216 provide the modems 203 and 204 information to enable the calls to the operator network. Modem interface modules 228 provide both a physical interface and a program interface allowing the radio interface layers 216 to communicate with modems 203 and 204. In FIG. 2 the control flows are shown by dotted lines, solid lines show the aggregated-data flows, and dash-dot lines show the distributed-data flows.

Connectivity service 212 and its aggregation controller 214 manage modems 203 and 204 and communicate with the operator network 110 regarding aggregation. For example, connectivity service 212 and aggregation controller 214 monitor the modems 203, 204 for their availability and for their radio conditions to determine if the modems 203, 204 can form a logical group to transmit the data at a higher data transmission rate. The connectivity service 212 also communicates through the radio interface layers 216, modem interface modules 228 and modems 203 and 204 to the operator network 110. In addition, the connectivity service 212 asks the operator network 110 if it can handle distributed data originating from an aggregation group of RF links from a group of the modems 203, 204, and if it can handle data at a resulting higher data transmission rate at the packet gateway 120. If the operator network 110 can handle data at the higher data transmission rate, and if it has the aggregation capable upgrades, the operator network 110 replies to the connectivity service 212 telling it to proceed with distributing the data to multiple RF links. Connectivity service 212 then sets up data connections on both radio links and both network interfaces show up on the application processor 202, each controlled by a different network driver instance 224, 226. Connectivity service 212 then obtains a single IP address assigned by the packet gateway 120 to both the aggregated link aggregation group and the aggregation module 222 that sits above the network drivers 224, 226 and below the TCP/IP stack 220.

The aggregation controller 214 generally operates to select modems, e.g. modems 203 and 204, for a radio-frequency-link aggregation group. If there are more than two modems in a communication device (e.g., communication device 100), the aggregation controller 214 may select two or more modems from all of the modems to form a set of selected modems to make up the radio-frequency-link aggregation group. Aggregation controller 214 sends this information to the aggregation module 222, which distributes data packets from the TCP/IP stack 220 between the modems 203, 204 for transmission.

A computing device, such as application processor 202, typically includes at least some form of computer-readable media. Computer readable media can be any available media that can be accessed by application processor 202. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by application processor 202.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as an optical fiber network, a wired network or direct-wired connection, and wireless media such as acoustic, RF, infrared, and other wireless media. Combinations of any of the above should also be included within the scope of computer-readable media. Computer-readable media may also be referred to as computer program product.

Figure 3:
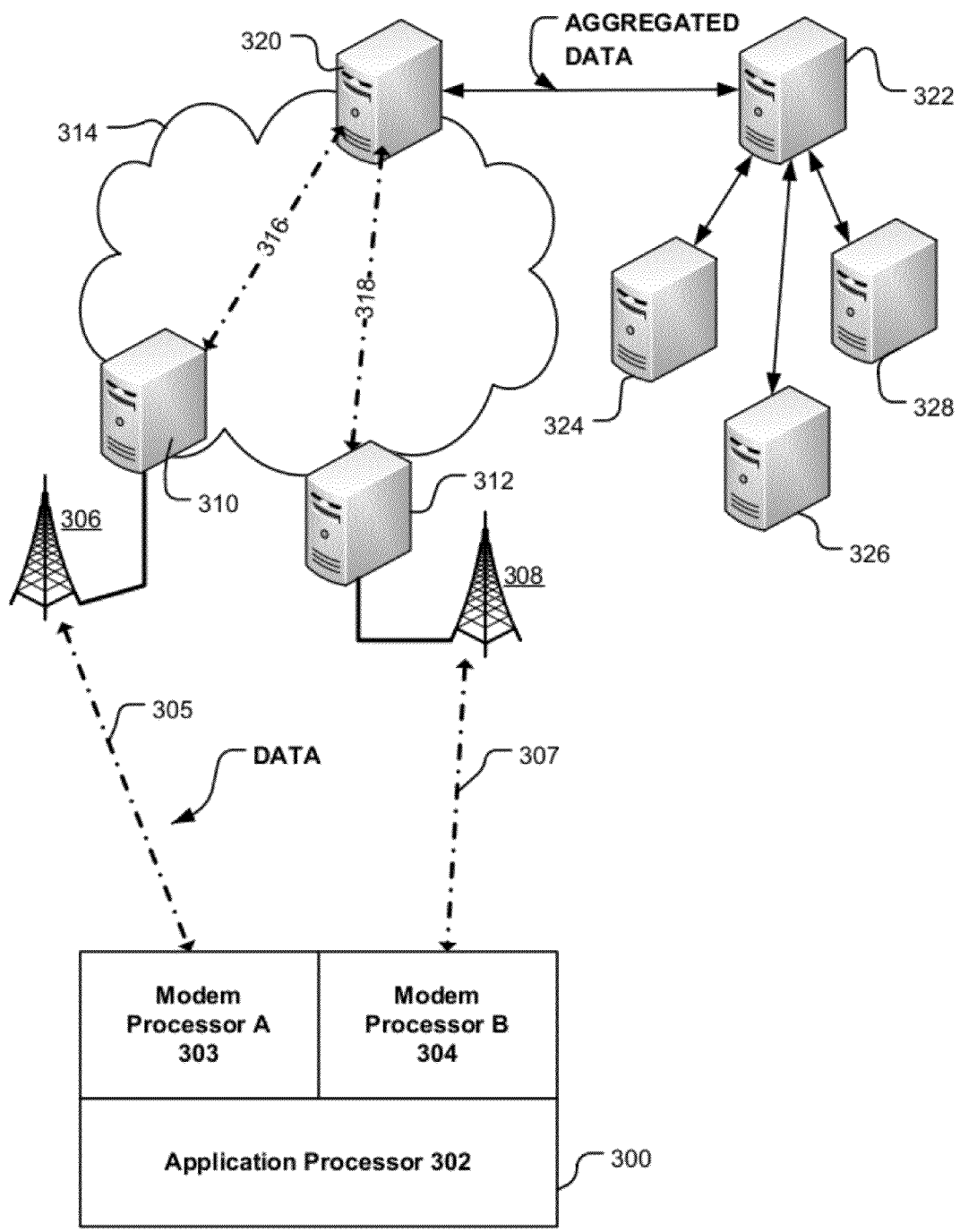
FIG. 3 shows the end-to-end data flow through a network between a communication device to Internet servers.

FIG. 3 shows the end-to-end data flow from a communication device 300 to Internet servers 324, 326 and 328. The depicted application processor 302 is an exemplary implementation of application processor 202 in FIG. 2, and modem-processor-A 303 and modem-processor-B 304 are exemplary implementations of modems 203 and 204, respectively, in FIG. 2. The data from an application running on the application processor 302 is distributed to modem-processor-A 303 and modem-processor-B 304. Modem-processor-A 303 transmits its portion of distributed data from its application over RF link 305 to cellular tower 306. Similarly, modem-processor-B 304 transmits its portion of distributed data from its application over RF link 307 to cellular tower 308. As shown, RF link node 310 in the operator network 314 receives the distributed-data packets from tower 306 and sends them on a network link 316 in the operator network 314 to packet gateway 320. Likewise, RF link node 312 in the operator network 314 receives the distributed-data packets from tower 308 and sends them on a network link 318 in the operator network 314 to packet gateway 320. Each of RF link nodes 310 and 312 include a modem to demodulate the RF signal received over RF links 305 and 307, respectively. The transmission over RF links 305 and 307 to the operator network 314 and thereafter through landline links and nodes in the operator network 314 to packet gateway 320 operates in accordance with the 3GPP and TCP/IP protocols in a well-known manner.

Packet gateway 320 has an aggregation module, which combines the distributed data received over network links 316 and 318 into aggregated data in accordance with TCP/IP protocols. The aggregated data is then forwarded from the packet gateway 320 to the Internet gateway 322, which forwards the data to the Internet servers 324, 326 and 328. These Internet servers 324, 326 and 328 offer the requested service to the applications on the communication device 300 completing the end-to-end data flow from an application in communication device 300 to one or more of the Internet servers 324, 326 and 328. The Internet servers 324, 326 and 328 may be any of the thousands of web servers providing services to applications residing on communication devices such as the communication device 300.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 4:
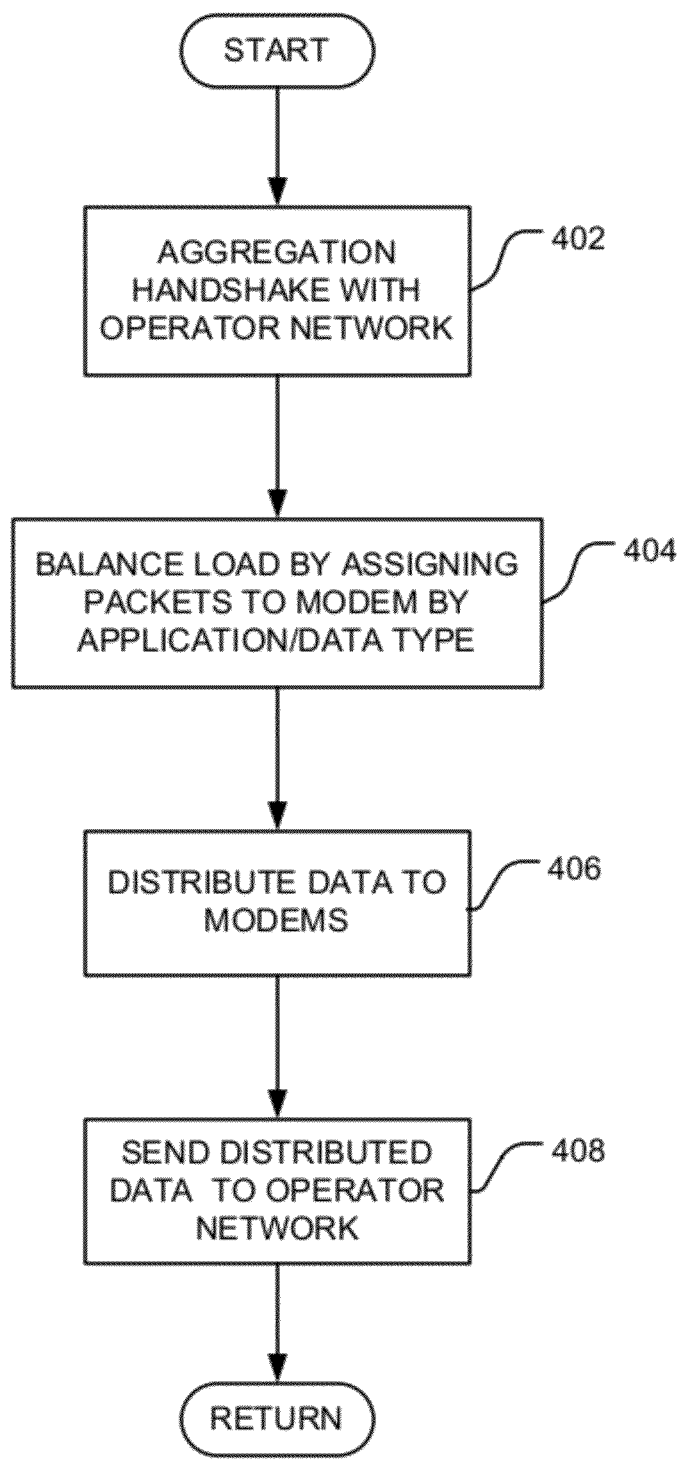
FIG. 4 illustrates the flow of operations performed at the communication device to increase the bandwidth of data transmission from the communication device to an operator network.

FIG. 4 illustrates the flow of operations performed at a communication device (e.g., communication device 100) to increase the bandwidth of data transmission from the communication device to an Internet server (e.g., one or more of the internet servers 124, 126, 128). As shown, an aggregation handshake operation 402 is performed between a connectivity service (e.g., connectivity service 212) with its aggregation controller (e.g., aggregation controller 214) and an operator network (e.g., the operator network 314). The aggregation handshake operation 402 opens communication between the communication device and the operator network, and sends subscription information for modems (e.g., modems 104, 106, 108) to the operator network. Aggregation handshake operation 402 also verifies that the operator network can handle transmission of distributed data from multiple modems.

Balance load operation 404, which is performed in the aggregation module, analyzes the transmission capacity (data transmission rate) of the modems and assigns data packets according to an aggregation algorithm to the modems for transmission over the RF links. In one variation of the aggregation algorithm, the data packets are assigned by application type or by file type. For example, data from applications requiring a higher data transmission rate, such as video data, may be assigned to 4G modem (e.g., 4G modem 204), while data, such as text data, requiring a relatively lower data rate would be assigned to a 3G modem (e.g., 3G modem 203). Other load balance algorithms well known in transmitting data packets over multiple landline links in an operator network might be applied to balance the data load from multiple applications between two or more (e.g., modems 104, 106, 108). Distribute data operation 406 distributes the data packets to the modems in accordance with the assignment of the data packets to each modem by the balance load operation 404.

Send distributed data operation 408 modulates the data signal representing the distributed-data packets and transmits the distributed data on an RF link to the operator network. Modem processors and transceivers in modems (e.g., modems 104, 106, 108) perform the send distributed data operation 408.

Figure 5:
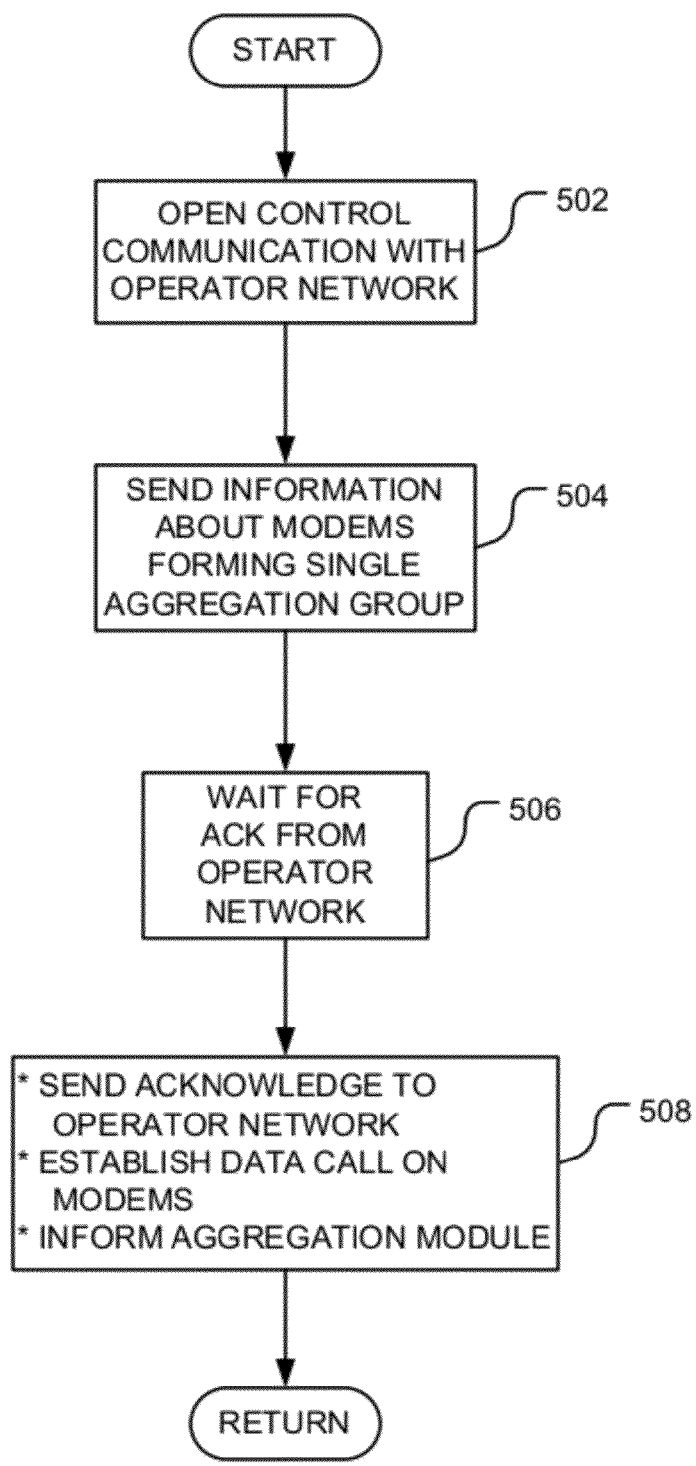
FIG. 5 illustrates the operational flow of the handshake module of FIG. 4.

FIG. 5 illustrates the operational flow of an aggregation handshake operation (e.g., the aggregation handshake operation 402 of FIG. 4). The aggregation handshake operational flow begins with open control communication operation 502. This operation contacts an operator network (e.g., operator network 314) to open communication with the controls in the operator network. Modem information operation 504 sends information about the modems forming the single aggregation group to the operator network. The modem information includes subscription information and modem identifiers. Modem Identifiers may be the Electronic Serial Number (ESN) or Mobile Equipment Identifier (MEID) or International Mobile Equipment Identity (IMEI) that uniquely identifies the mobile modem.

In one exemplary embodiment the communication device has one subscription identifier, e.g., a PSTN-type phone number, which is used by two or more modems (e.g., modems 104, 106, 108). In this embodiment the operator network agrees to receive two or more RF links calling from the same phone number. In another embodiment the communication device has one account number and a subscription identifier (phone number 104) that is different for each modem. In this embodiment the operator network would bill all phone numbers used by the communication device to one account number.

Wait operation 506 waits for the operator network to acknowledge the radio-frequency-link aggregation group. Once the operator network agrees that it can handle the radio-frequency-link aggregation group, the network sends an acknowledge (ACK) to the handshake module. In response to the ACK from the operator network, acknowledge operation 508 sends ACK back to the operator network, establishes a data call on two or more modems in the group (e.g., the two or more RF links will be assigned a single IP address by the Packet Gateway 320), and informs the aggregation module of the new aggregation group. The operation flow returns to FIG. 4 where the next operation is the balance load operation 404.

Figure 6:
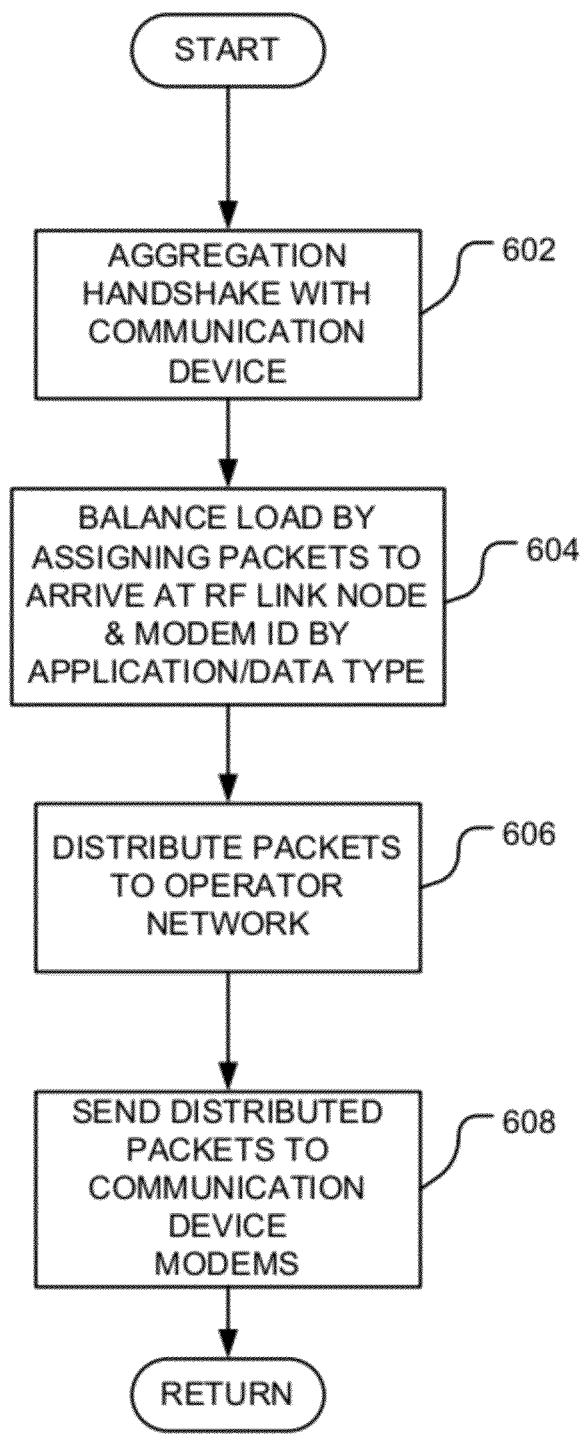
FIG. 6 illustrates the flow of operations at the packet gateway when the Internet server is sending data to the communication device.

FIG. 6 illustrates the flow of operations at a packet gateway (e.g., the packet gateway 320) when an Internet server (e.g., one or more of Internet servers 324, 326, 328) is sending data to a communication device (e.g., the communication device 300). When data from an Internet server is addressed to the communication device and arrives at a packet gateway (e.g., the packet gateway 320), an aggregation module (not shown) in the packet gateway is called by the operating system at the packet gateway. The call to the aggregation module initiates an aggregation handshake with the communication device 602, which opens control communication with the communication device in order to commence sending the data to the communication device. From previous communication between the communication device and the Internet server, the packet gateway already has information about the modem IDs, the RF link nodes (e.g., RF link nodes 310, 312) in an operator network (e.g., operator network 314) for each modem, and data transmission rate for each modem.

Once control communication is established by the aggregation handshaking 602, balance load operation 604 analyzes the transmission capacity of two or more modems (e.g., the modem processors 303 and 304) and assigns data packets to the modems for transmission over their RF links. In one embodiment the data packets are assigned by application or data type as previously described above with reference to FIG. 4. When the packet gateway already knows the communication device's modem IDs and RF link nodes on the operator network, the balance load operation 604 may assign data packets to arrive at the previously used RF link nodes for the communication device modems. Other load balance algorithms well known in transmitting data packets over multiple links in an operator network might be applied to balance the load to arrive at the appropriate modems.

Distribute packets operation 606 distributes and sends the data packets to the links on the operator network in accordance with the assignment of the data packets by the balance load operation 604. Of course the path through the operator network may vary, but in the context of the embodiment described with reference to FIG. 3, the distributed-data packets will be addressed to arrive at the RF link node 310 or 312 associated with the modem-processor-a 303 or modem-processor-b 304, respectively, having the expected data transmission rate.

As shown, an RF send operation 608 is performed (e.g., at the RF link nodes 310 and 312), which modulates the data signal representing the distributed-data packets and transmits them (e.g., on RF links 305 and 307, respectively) to two or more modems (e.g., the modem processors 303 and 304). In the context of the embodiment described with reference to FIG. 3, modem processors (not shown) in RF link nodes 310 and 312 may be any digital processor or digital signal processor, and transceivers (not shown) at the RF link nodes transmit the distributed data over the RF links to the modem processors 303 and 304. The modem processors 303 and 304 demodulate the distributed data and forward distributed data packets to an aggregation module (e.g., the aggregation module 222) in the communication device. As discussed with reference to FIG. 2, the aggregation module 222 combines the data packets and forwards the aggregated data stream to an appropriate one of the application 210 called by one of the Internet servers (e.g., Internet servers 324, 326 or 328).

Figure 7:
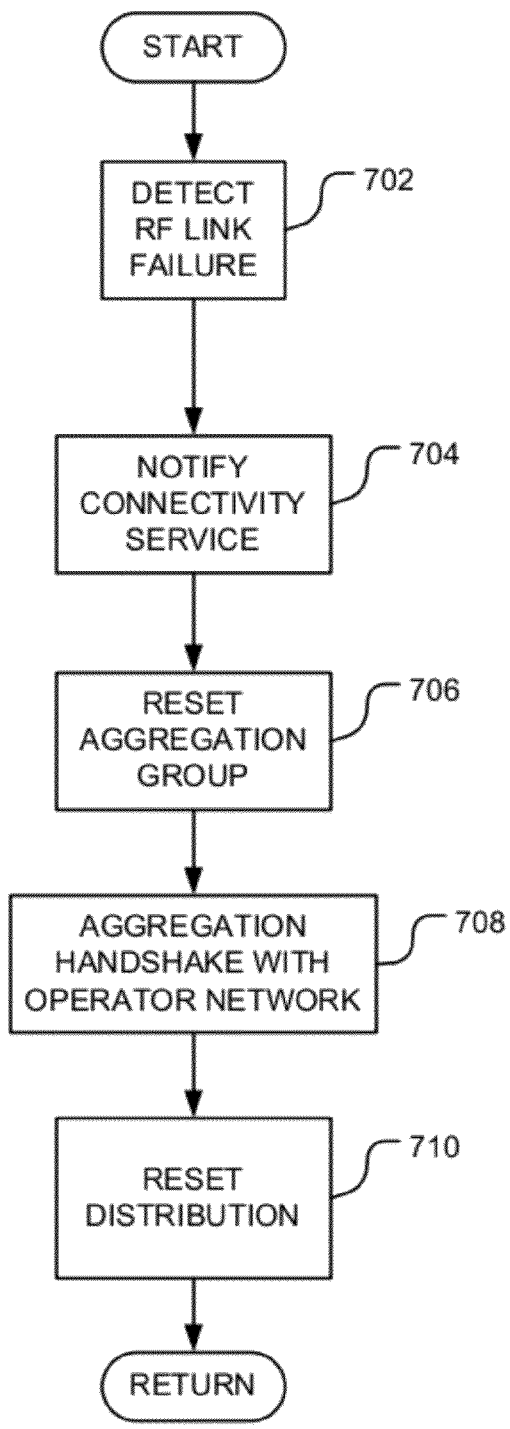
FIG. 7 illustrates a flow of failure recovery operations for the communication device in the event one of the RF links goes down.

FIG. 7 illustrates a flow of operations for the communication device in the event one of the RF links fails. In this embodiment for link-failure recovery operations, the communication device has more than two modems. When the operation flow begins, the communication device has been operating with a set of selected modems chosen from modems available at the communication device before the failure. As shown, a failure detect operation 702 (e.g., running on a modem processor) detects an RF link failure when its RF link goes down. Notify operation 704 sends a link failure message from the modem with the RF link failure to a connectivity service (e.g., connectivity service 212). In the context of the embodiment described with reference to FIG. 2, this link failure message is sent through control lines to the modem interface module 228, to the radio interface layer 216, and to the connectivity service. Connectivity service 212 sends the modem ID of the failed link to the aggregation controller 214.

Reset aggregation operation 706 (e.g., operating in aggregation controller 214) chooses the modems for a new set of selected modems in a new RF link aggregation group. The modem with the failed RF link is removed from the set, modems available at the communication device are detected, and a new set of selected modems is chosen to make up the new RF link aggregation group. The reset aggregation operation 706 may also select a new aggregation algorithm based on the selected modems in the new set and on their data transmission rates. Handshake operation 708 notifies the operator network (e.g., operator network 110, 314) of the modem ID and RF link that went down. Handshake operation 708 also sends the operator network the subscription information and modem IDs for a new set of selected modems in a new RF link aggregation group. And reset distribution operation 710 resets the aggregation module 222 to distribute data to the new set of selected modems in accordance with the new aggregation algorithm. Of course, if the communication device has two modems as shown in FIG. 2, and one RF link goes down, the connectivity service and aggregation controller would default to operating with the one remaining good modem and RF link.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A communication device comprising:
    at least two modems,
    an application processor configured to distribute data from an application residing on the communication device to said at least two modems for RF transmission;
    an aggregation controller configured to select from the at least two modems to form a set of selected modems for a radio-frequency-link aggregation group;
    a connectivity module configured to
        send, to an operator network, subscription information and modem identifiers for the selected modems in the radio-frequency-link aggregation group, wherein the subscription information enables the operator network to bill an account associated with the selected modems;
        monitor availability of the at least two modems for the radio-frequency-link aggregation group; and
        acknowledge that the operator network, connected to radio frequency links of the radio-frequency-link aggregation group, has agreed to handle aggregated data from the radio-frequency-link aggregation group; and
    an aggregation module configured to receive data from the application and distribute data to the selected modems in accordance with an aggregation algorithm; and
    wherein said selected modems are configured to send distributed data received from the application processor over a radio frequency link to a radio frequency node in the operator network.

2. The communication device of claim 1 further comprising:
    a load balancing module configured to analyze, responsive to the aggregation algorithm, a transmission capacity of the selected modems and distribute the data from the application according to the aggregation algorithm and the transmission capacity of the selected modems.

3. The communication device of claim 2 wherein the aggregation algorithm is based on a type of application or a type of data being transmitted.

4. A communication device comprising:
    a plurality of modems;
    an aggregation controller means for selecting an aggregation algorithm and a set of selected modems for a radio-frequency-link aggregation group, the set of selected modems selected from the plurality of modems;
    means for monitoring availability of each of the plurality of modems for the radio-frequency-link aggregation group;
    means for acknowledging that an operator network, connected to radio frequency links of the radio-frequency-link aggregation group, has agreed to handle aggregated data from the radio-frequency-link aggregation group;
    connectivity means for sending, to an operator network, subscription information and modem identifiers of the modems in the radio-frequency-link aggregation group from the communication device, wherein the subscription information enables the operator network to bill an account associated with the selected modems; and
    an aggregation means, responsive to the aggregation controller means, for distributing data that is received from an application to the selected modems selected by the aggregation controller means whereby a data transmission rate from the communication device is increased.

5. The communication device of claim 4 wherein said aggregation means comprises:
    a load balancing means for analyzing the transmission capacity of the selected modems and distributing the data from the application according to the selected aggregation algorithm and the transmission capacity of the selected modems.

6. The communication device of claim 5 wherein the aggregation algorithm is based on a type of the application providing the data for transmission or the type of data being transmitted.

7. The communication device of claim 4 wherein the subscription information sent by said connectivity means has one subscription identifier that is the same for all of the selected modems.

8. The communication device of claim 4 wherein the subscription information sent by said connectivity means has a different subscription identifier for each of the selected modems and one account number for the communication device.

9. A method for aggregating multiple modems of a communication device into a radio-frequency-link aggregation group to increase the bandwidth of the radio frequency data transmission from the communication device, said method comprising:
    selecting an aggregation algorithm and a set of selected modems from the multiple modems to make up the radio-frequency-link aggregation group;
    sending, to an operator network, subscription information, modem identifiers, and radio-frequency-link information for the selected modems from the communication device wherein the subscription information enables the operator network to bill an account associated with the selected modems;
    distributing data, received from an application program, to the selected modems for data transmission from the communication device whereby the data transmission rate from the communication device is increased; and
    detecting a radio frequency link failure at a failed modem in the set of selected modems;
    said selecting includes removing the failed modem from the set of selected modems and choosing a new set of selected modems; and
    resending modem identifiers corresponding to the new set of selected modems.

10. The method of claim 9 wherein selecting the aggregation algorithm includes:
    monitoring availability of each of the multiple modems for the radio-frequency-link aggregation group; and
    selecting the aggregation algorithm based on a type of application data being transmitted and a data transmission rate of each modem in the set of selected modems.

11. The method of claim 10 wherein distributing data includes:
    distributing data to each of the selected modems in the radio-frequency-link aggregation group based on the aggregation algorithm selected.

12. The method of claim 9 wherein subscription information for the selected modems includes a subscription identifier and all of the selected modems have a same subscription identifier.

13. The method of claim 9 wherein subscription information for the selected modems includes a subscription identifier and each of the selected modems has a different subscription identifier.

14. A non-transitory, tangible computer readable storage medium, encoded with processor readable instructions to perform a method for aggregating multiple modems of a communication device into a radio-frequency-link aggregation group, said method comprising:
- selecting an aggregation algorithm and a set of selected modems from the multiple modems to make up the radio-frequency-link aggregation group;
- sending, to an operator network, subscription information, modem identifiers, and radio-frequency-link information for the selected modems from the communication device wherein the subscription information enables the operator network to bill an account associated with the selected modems;
- distributing data received from an application program to the selected modems for data transmission from the communication device whereby the data transmission rate from the communication device is increased;
- detecting a radio frequency link failure at a failed modem in the set of selected modems;
- said selecting includes removing the failed modem from the set of selected modems and choosing a new set of selected modems; and
- resending modem identifiers corresponding to the new set of selected modems.

15. The non-transitory, tangible computer readable storage medium of claim 14 wherein:
- selecting includes monitoring availability of each of the multiple modems for the radio-frequency-link aggregation group; and
- sending connectivity information includes sending modem identifiers and radio frequency links for each modem in the set of selected modems.

16. The non-transitory, tangible computer readable storage medium of claim 14 wherein sending connectivity information includes:
- sending subscription information for the selected modems wherein all of the selected modems have a same subscription identifier.

17. The non-transitory, tangible computer readable storage medium of claim 14 wherein sending connectivity information includes:
- sending subscription information for the selected modems where each of the selected modems has a different subscription identifier.

* * * * *